June 29, 1965            M. GRINGRAS            3,192,297

METHOD OF AND APPARATUS FOR MOLDING REINFORCED PLASTICS

Filed June 19, 1962            2 Sheets-Sheet 1

INVENTOR.
MICHEL GRINGRAS

BY Bauer and Seymour
ATTORNEYS

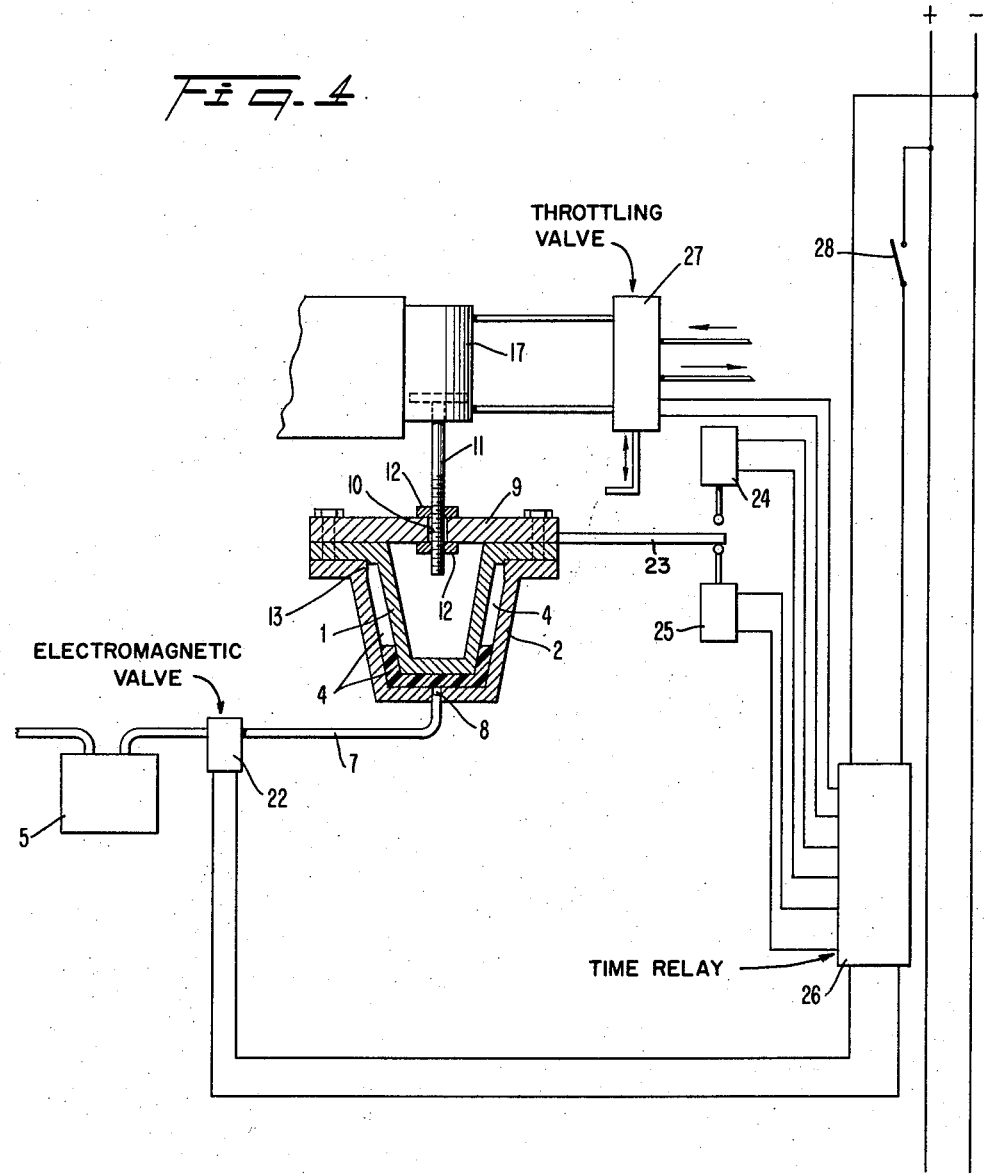

United States Patent Office 3,192,297
Patented June 29, 1965

3,192,297
METHOD OF AND APPARATUS FOR MOLDING REINFORCED PLASTICS
Michel Gringras, Paris, France, assignor to Compagnie de Saint-Gobain, Neuilly-sur-Seine, France
Filed June 19, 1962, Ser. No. 203,525
Claims priority, application France, June 20, 1961, 865,465
17 Claims. (Cl. 264—257)

The present invention relates to a method of and apparatus for injection molding bodies from plastic material reinforced with fibrous substances.

In the conventional molding of bodies from reinforced plastic material, liquid resins polymerizable in situ, such as polyester resins, are injected into a mold which is generally composed of two pieces. Such mold pieces, usually male and female, present between them when they are assembled a space corresponding to the shape of the object to be molded. The reinforcement, such as mats made of glass fibers, for the body is placed within the mold before the injection of the resin thereinto.

Because the reinforcing fibers present a high resistance to penetration therebetween by the resin and thus a great loss in the injection pressure, the resin must be injected into the mold under a relatively high pressure. It is for this reason that, in conventional injection molding to form fiber reinforced resin bodies in two-part molds, the two parts of the mold must be very strongly held together before and during the step of resin injection, and the mold parts must as a consequence be made very strong mechanically. The equipment necessary for such process is consequently expensive and awkward to manipulate. Such disadvantages are particularly great when the bodies being made are of large dimensions, such as hulls of boats, automobile bodies, etc. Further, in spite of the high pressure used in injecting the resin into the mold, the penetration of the resin into the corners of the mold and above all the interstices of the fiber reinforcement is very slow, so that the injection molding of a body requires that the mold be employed for a long time in forming such particular body. Thus the productivity of the molding equipment is low and the cost of making the body is high.

The present invention has for its object the elimination of the disadvantages of the above described prior art method of injection molding plastic bodies reinforced with fibrous materials. The method and apparatus in accordance with the present invention allow the molding in a very short time of bodies of reinforced plastic material. Such method and apparatus accomplish this result in molds of low mechanical strength, without the risk of displacing or "washing" of the fibrous reinforcing material, while assuring a rapid and complete penetration of the resin to the center of the reinforcing material. The method and apparatus of the invention avoid the occlusion of bubbles of air in the resin in spite of the porous structure of the fibrous reinforcement.

In the drawings accompanying this application and forming a part thereof:

FIG. 4 is a schematic view of apparatus similar to that of FIGS. 1 and 2 but with automatic control mechanism employed therewith.

Figure 1:
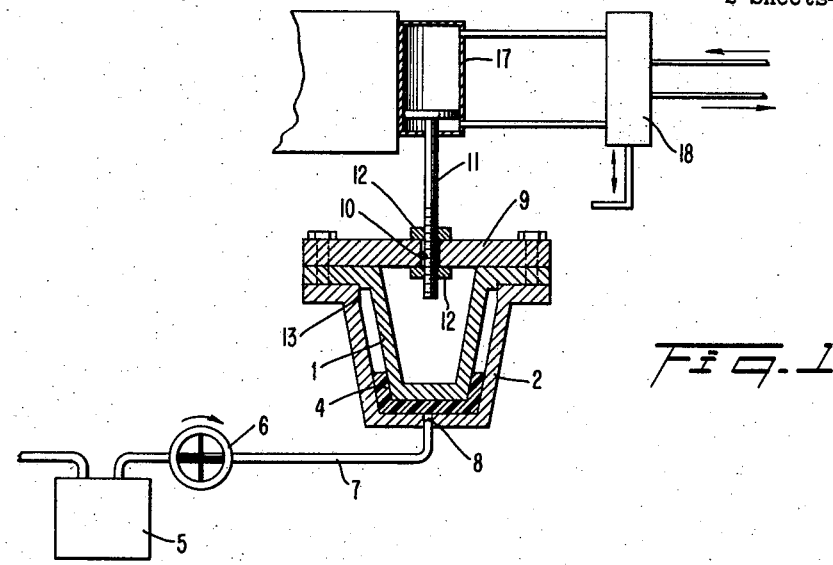
FIG. 1 is a somewhat schematic view of apparatus which may be employed in carrying out the method of the invention, such apparatus being manually controlled, the mold being shown in its "closed" position.

The method in accordance with the invention consists in injecting liquid resin under pressure into a two-part mold, the parts of the mold being capable of relative movement away from each other. The resin is introduced into the mold in successive small charges, the mold being allowed to open to atmosphere under the pressure of the resin during the injection of each charge, the mold parts being closed, between the injection of successive charges of resin, so that when closed the mold parts are spaced apart to an extent generally corresponding to the thickness of the finished part being molded. After the mold has reached such closed position, a new charge of resin is injected into the mold and the mold is again allowed to open under the pressure of the resin, as above described. Such process of repeatedly injecting a small charge of resin into the mold, allowing the mold to open, and then closing the mold, is continued until a total predetermined quantity of resin has been introduced into the mold, such quantity being sufficient to give the desired proportion of resin with respect to the fibrous reinforcement. After the mold has been closed for the last time, the resin is polymerized in the closed mold, the mold being held closed until the removal of the finished body therefrom after polymerization of the resin is complete.

One of the advantages of the method and apparatus of the invention is the fact that since the mold opens under the pressure of the resin during its injection into the mold, the mold does not need to exert a large counter-pressure against the injection of the resin. Thus the mold employed in carrying out the method of the invention may be of light construction and of only moderate mechanical strength. Since the injection of resin is stopped while the mold parts are being moved toward each other, that is, the mold is being closed, there is no possibility of overstressing the mold even though the resin is injected into the mold under very high pressure. Experience has proved that the total time required to injection mold a large body by the method of the present invention is on the order of $\frac{1}{10}$ the total time required to mold the same body by prior injection methods.

The method of the invention may be carried out advantageously by molding apparatus in which the successive operations of injecting a charge of resin, opening the mold, stopping the injection of resin, and closing the mold are automatically controlled in accordance with a predetermined cycle. Apparatus for this purpose is shown in FIG. 4.

Generally, for such automatically controlled molding apparatus there is employed a mold in which one of the parts, for example the lower part, is fixed, the upper part of the mold being movable vertically toward and away from the lower part of the mold. The movable part of the mold is provided with a device such as a feeler, contactor, or a screen travelling to intercept a beam of light directed toward a photoelectric cell, etc., so that when the two parts of the mold have separated a predetermined distance a mechanism such as a cylinder acting upon the movable mold part is actuated, whereby to close the mold, and a valve to stop the injection of resin is closed. The system is under the control of a time relay which functions at the end of a predetermined time to free the movable part of the mold and to open the injection valve so that a further part of the cycle involving resin charge injection and mold opening, etc., may take place.

It is easy to change the extent of travel of the movable part of the mold. It is advantageous to choose a length of travel of such mold part which is on the order of a third of the thickness of the body being molded. The shorter the chosen extent of travel of the movable mold part, the shorter should be the duration of injection of each charge; although this increases the number of cycles in the total process, it aids in the removal of gas bubbles from the molded body, and does so without lengthening the total time of injection of resin into the mold.

It should be noted that in general in the automatic operation of the above described apparatus the time necessary to secure the closing of the mold becomes increasingly longer as the total quantity of resin which has been injected into the mold increases. As the mold fills, the injection phases become shorter and the mold opens more quickly. In other words, progressively less resin is injected into the mold in each succeeding injection phase of the process.

The following example gives definite quantities and times in a typical operation in accordance with the method of the invention.

EXAMPLE

This example is concerned with the injection molding of a piece of polyester resin reinforced with glass fibers of which the glass fibers made up 27% by weight of the molded product. The total weight of resin injected was 7 kilograms. The total operation required about 3 minutes, such total time being the sum of the periods of opening and closing the mold.

In the following table, there are given the durations of the different phases of successive injections, and durations of the closing of the mold following each injection phase.

Table

| Injection Phases, seconds | Phases of closing the mold, seconds |
|---|---|
| 30 | 6 |
| 14 | 9 |
| 8 | 12 |
| 6 | 15 |
| 4 | 20 |
| 4 | 28 |
| 4 | 30 |
| Total 70 | Total 120 |

If it is desired, the injection pressure of the resin into the mold may be pulsed, that is to say, periodically variable, so that the resin travels in a series of very short high frequency impulses, in the course of which the instantaneous pressure may be very high, for example, on the order of two or three times the basic injection pressure.

Figure 2:
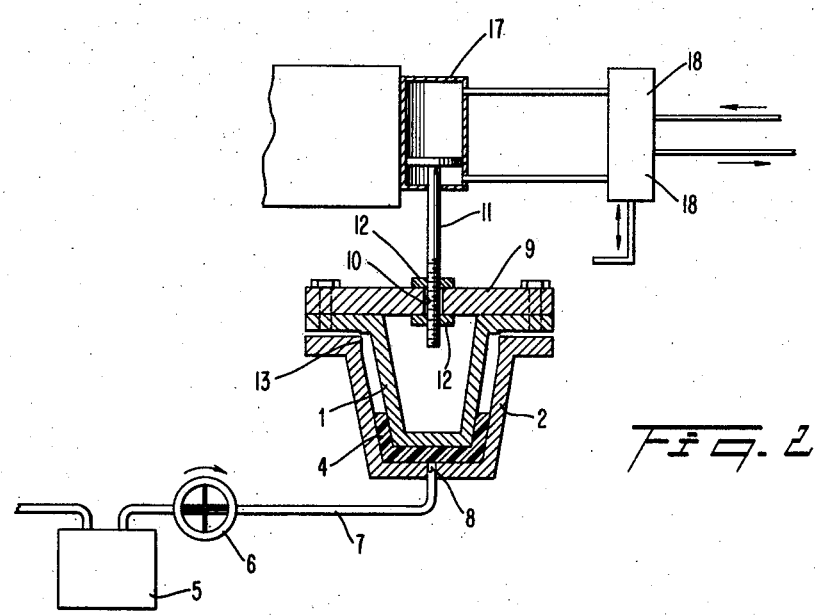
FIG. 2 is a view similar to FIG. 1 but with the mold parts in their further spaced position which they assume after a resin injecting phase of the method.

Turning now to the drawings, in FIGS. 1 and 2 there is shown somewhat schematically a mold having a fixed lower part 2 and a movable upper part 1. Such mold is supplied with liquid resin under pressure from a source 5, through a manually operable valve 6, and a conduit 7 connected to a port 8 in the bottom of mold part 2. The movable mold part 1 has a bridge member 9 connected to the upper end thereof, such bridge member having a central hole 10 therein. A vertical piston rod 11 of a double acting reciprocable fluid motor 17 has its lower end extending freely through hole 10. Nuts 12 are disposed on screw 11 on each side of bridge 9, the nuts permitting the piston rod to be adjustably attached to bridge 9.

In FIG. 1 the mold is shown closed, the mold cavity 4 therein being partially filled with resin. In FIG. 2 the apparatus is shown in the condition which it assumes after an injection phase, the valve 6 having then been closed and the movable upper mold part 1 having been raised somewhat against only the weight of parts 1, 9, 11, and the piston. In the position of the mold parts shown in FIG. 2 the shoulder 13 on mold part 1 has just cleared the fixed mold part 2, thus opening the mold cavity to atmosphere. After the mold has been filled to the level shown in FIG. 2 for example, fluid under pressure is directed into the upper end of cylinder 17 by actuation of a manually operated reversing and throttling valve 18, whereby to thrust mold part 1 downwardly as a speed chosen by adjustment of valve 18 to return it to the position of FIG. 1. Valve 18 is then operated to relieve the upper end of cylinder 17 of pressure. The resin injection phase of the operation is then repeated, as above described.

Figure 3:
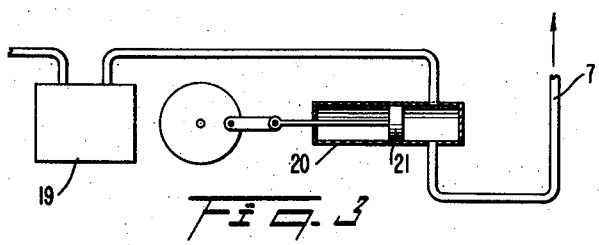
FIG. 3 is a schematic view of mechanism which may be employed to pulse the resin during its delivery into the mold.

In FIG. 3 there is shown schematically a mechanism by means of which the resin may be pulsed during its injection into the mold. A source 19 of liquid resin under high pressure is connected to a cylinder 20 in advance of a piston 21, which is reciprocated by known means such as a crank. The conduit 7 leading from the cylinder 20 is led, as before, to the port 8 of the mold. Upon rotation of the crank by suitable driving means (not shown) the resin delivered under high pressure by source 19 to cylinder 20 is subjected to alternate increases and decreases in pressure, with respect to that of source 19, as it is delivered to the mold through conduit 7.

In the embodiment of the apparatus of FIG. 4 there have been added to the basic combination shown in FIGS. 1 and 2 mechanisms whereby the method in accordance with the invention may be carried out automatically in accordance with a predetermined program, without the necessity of manual opening and closing of valve 6 and of operating fluid motor 17. To accomplish this purpose the following additional and/or substituted elements are provided.

An electromagnetically controlled valve 22 is substituted for the manual valve 6 of FIGS. 1 and 2. Upper and lower limit switches 24 and 25, respectively, supported on fixed structure, are disposed to be operated by an arm 23 affixed to and projecting horizontally from movable mold part 1. A time relay 26 is provided, the relay being adjustable to provide a predetermined desired timed cycle of operation, including one such as that set forth by way of illustration in the above example.

The apparatus of FIG. 4 functions as follows, once the reinforcing material has been put into the mold and the mold closed as in FIG. 1. A switch 28 in the control circuit is now closed, thereby energizing the valve 22 to open the valve so that resin under high pressure flows into the mold cavity. At the same time, the time relay 26 is energized to time such phase of resin injection and, at the end of a predetermined time interval, to deenergize valve 22, thereby to close it. During injection of resin into the mold, the movable mold part 1 has been allowed to rise, restrained only by gravity and the action of exhausting fluid from the upper end of cylinder 17.

At the end of its upward travel, the upper movable mold part 1 acting through arm 23 closes upper limit switch 24, thereby directing fluid under pressure to the upper end of motor 17 to thrust the movable mold part downwardly into closed position. When the movable mold part reaches its lower terminal, closed position, the arm 23 operates the lower limit switch 25 to stop the introduction of fluid under pressure to the upper end of motor 17 and to open the upper end of motor 17 to the atmosphere. The time relay 26 functions to adjust a throttling valve 27 in series with the delivery pipe to the upper end of motor 17, whereby to effect the closing of the mold, after each resin injecting phase, at the predetermined speed chosen for such phase of the operation. The various controls and their manner of interconnection are shown somewhat schematically in FIG. 4, since such controls are all well-known, and their manner of interconnection is obvious to one skilled in the art.

Although only a limited number of embodiments of the invention have been illustrated in the accompanying drawings and described in the foregoing specification, it is to be especially understood that various changes, such as in the relative dimensions of the parts, materials used, and

What is claimed is:

1. A method of injection molding objects of plastic material reinforced with fibrous material, comprising placing the requisite amount of fibrous reinforcing material in a multi-part mold divided to permit movement of the mold parts toward and from each other, moving the parts of the mold together into substantially their closed position wherein they conjointly define a mold cavity having the dimensions of the finished molded article to be made, injecting liquid resin into the mold in small successive portions while allowing the mold to open under the pressure of the injected resin during each said resin-injecting step, thrusting the parts of the mold together into substantially said closed position after each said resin-injecting step while stopping injection of resin into the mold, and sequentially and cyclically repeating said resin-injecting and mold-closing steps until the mold is substantially filled to the desired extent.

2. The method of claim 1, the mold parts being moved from closed to open positions, by and in response to force exerted therebetween by the resin being injected.

3. The method of claim 2, the resin being injected into the mold under a pulsing pressure having a range extending above and below the otherwise normal constant injection pressure.

4. The method of claim 2, the resin-injection period for each sequential cycle progressively decreasing.

5. The method of claim 2, the period for moving the mold parts from open to closed position progressively increasing for each sequential cycle.

6. The method of claim 2, and polymerizing the injected resin in situ after the final cycle.

7. The method of injection molding by means of a mold comprising two parts relatively movable from a first position conjointly defining a closed cavity having the shape and size of the article to be molded, to a second position wherein the volume of said cavity is enlarged and automatically opened to atmosphere, said method comprising cyclically (1) injecting resin into said cavity to thereby force said mold parts from said first position to said second position, (2) stopping injection of resin when said parts attain said second position, (3) forcing said mold parts from second to first position, (4) again initiating injection of resin in response to movement of said parts into said first position, and cyclically repeating steps (1), (2), (3) and (4) until the mold is filled.

8. The method of claim 7, decreasing the time periods of resin injection of each succeeding cycle, and correspondingly increasing the time period of movement of said mold parts from said second posiiton to said first position.

9. The method of claim 7, and pulsing the pressure by which resin is injected into the mold cavity.

10. In a resin molding apparatus, first and second mold parts, means mounting said mold parts for free, substantially unopposed movement toward and from each other, from a first position wherein said parts conjointly define a closed mold cavity having the shape and size of the part to be molded, to a second position wherein said cavity is open to atmosphere, means for injecting resin under pressure into said cavity, when closed, to thereby force said parts into said second position, means operable to cut off flow of resin to said cavity, and power means operable to force said mold parts to their said first position.

11. An apparatus as claimed in claim 10, comprising means to vary the quantity of resin injected into the mold at each resin portion injection.

12. The apparatus of claim 10, said first mold part being translatable relatively to said second part, a fluid motor having a part connected with said first mold part, and fluid pressure control valve means connected with said motor and operable to alternatively connect said motor to exhaust to permit substantially unimpeded translation of said first mold part to second position under the pressure of resin being injected into said cavity, or to a source of pressure fluid to force said mold parts into said first position.

13. The apparatus of claim 10, and means for pulsing the pressure under which resin is injected into said cavity.

14. An apparatus as claimed in claim 13, comprising means for varying the speed at which the mold parts are brought to substantially closed position following each resin portion injecting step.

15. In a resin-molding apparatus, a mold comprising first and second parts, means mounting said parts for positively-guided substantially free relative movement from a first position wherein said parts conjointly define a closed cavity having the shape and size of the part to be molded, to a second position wherein the volume of said cavity is enlarged and automatically opened to atmosphere, power means controllable to apply a selectively variable force to said parts to force them together into first position, and conduit means conveying resin under pressure into said cavity.

16. The apparatus of claim 15, a valve in said conduit means, time control means responsive to movement of said mold part to said first position to open said valve, said time control means operating to close said valve after a predetermined time period of resin injection, and means including said time control means to render said power means operative by and in response to movement of said mold parts to said second position.

17. The apparatus of claim 16, said time control means operating to sequentially decrease the time period of resin injection and to correspondingly increase the time of movement of said mold parts from said second to said first position.

References Cited by the Examiner

UNITED STATES PATENTS

| | | | |
|---|---|---|---|
| 2,671,247 | 3/54 | Lester | 18—30 |
| 2,781,547 | 2/57 | Moxness | 18—55 XR |
| 2,786,234 | 3/57 | Beyer | 18—30 |
| 3,016,574 | 1/62 | Fischer et al. | |
| 3,028,284 | 4/62 | Reeves | 18—55 XR |

ALEXANDER H. BRODMERKEL, *Primary Examiner.*